TAPE GUIDE FOR RECORDING MACHINES

Filed April 25, 1962

INVENTORS:
Jonathan Hunter
Theodore Snyder
By
Agent

1

3,240,441

TAPE GUIDE FOR RECORDING MACHINES

Jonathan Hunter, Woodland Hills, Los Angeles, and Theodore Snyder, Los Angeles, Calif., assignors to Litton Systems, Inc., Beverly Hills, Calif.

Filed Apr. 25, 1962, Ser. No. 190,116
9 Claims. (Cl. 242—55.19)

This invention relates to tape guides, especially for recording machines using magnetizable tapes, and more particularly to tape guides for closed-loop tape recorders.

In apparatus of this type, an endless tape of considerable length is stored on, for example, one or two reels from which it is payed out and to which it is returned. With this type of closed-loop tape arrangement, the design using a pair of reels frequently includes a considerable length of straight path along which a number of tape layers travels in the form of a group of closely adjacent layers of tape moving, under ideal circumstances, at the same speed. Such group of tape layers may conveniently be referred to as a bundle, because it is composed of individual, parallel extending lengths of tape. However, it is understood that the layers are not tied one to another but guided by constraining elements to move in this configuration.

As a result of physical imperfections beyond practical control in performance and in the materials used, such bundles of parallel, closely adjacent tape layers have a tendency to produce a disturbance known in the art as "binding." Even though it may be theoretically assumed that all of the parallel tape layers in a bundle move at the same speed, this is not always so in practice. Under conditions of high temperature, high humidity, in the presence of foreign matter between tape layers or, as a further example, in the case of extremely small deformations in the tape, local increases in friction may occur. As a consequence, the speed of one or more layers becomes slightly but distinctly different from that of adjacent layers. Then, one of the many tape layers may bulge from its normally straight configuration to travel in a slightly curved path instead. Extremely small changes in coefficient of friction along the tape surface and very small stretching of a length of the tape are also considered to be contributory reasons for the appearance of surplus tape in the layers of moving tape. Even though the surplus length and the resulting deviation from the exactly straight paths may be of extremely small magnitude, their presence in a group or bundle of tape layers are the cause of severe disturbances.

It can readily be seen that, when in a group or bundle of closely adjacent parallel tape layers, one of the layers assumes a curved configuration, pressure builds up in a direction perpendicular to the direction of motion, across the layers of tape. This pressure contributes to a sudden and local increase in friction between tape layers and inhibits their relative motion which may be necessary to remove the disturbance. Flawless performance is not possible with this type of closed-loop recorder unless each layer in a tape bundle has the freedom to move with its proper speed, which may temporarily be different from that of adjacent tape layers. Thus, when the increased friction cannot be overcome by the force supplied

2 by a driving motor, the tape speed is essentially reduced and frequently tape motion ceases completely. Although deviation or bulging of one of the tape layers from its normally straight configuration cannot always be distinguished by the eye, the entire phenomenon gives the impression of tape layers sticking to one another as the result of the mentioned locally increased friction between tape layers; it is for this reason that the effect is generally referred to as "binding."

It will be apparent that the binding effect is especially likely to occur with tape recorders when subject to extremely high accelerations, or shocks, as in the case of airborne equipment, scientific apparatus employed in missiles, or in conjunction with space research instruments. As stated above, high temperatures, high humidity, deformations or irregularities in the tape, and even very small particles of foreign matter may cause this disturbance. In order to reduce the adverse effect of undesirable friction resulting in "binding," it is customary to use lubricated tapes. However, even when lubrication is employed, many malfunctions still may be traced to binding of layers of tape.

Accordingly, it is one of the main objects of the present invention to improve the performance of the tape driving mechanism in recording machines.

It is another important object of the invention to prevent binding effects in closed-loop tape recorders in which the tape travels in the form of a bundle of closely-adjacent tape layers.

Other objects of the invention include the design of shock-proof tape recorders by the use of a specific type of tape guide inhibiting the binding effect, the exclusion of disturbances caused by binding from apparatus in which tape moves in bundles of closely-adjacent layers, and the elimination of lubricants for tapes.

In accordance with a broad aspect of the invention, it was found that continuous smooth motion of a single tape length is achieved, and the binding effect can practically be eliminated from a multilayer tape bundle by imparting to it a curvature which is perpendicular with respect to the direction of motion. In other words, the moving tape or tape bundle is curved around an axis extending parallel with the direction of motion. As a result, the tape or tape layers travel along a predetermined straight path with a curved cross sectional configuration. Due to the curvature, the otherwise flexible tape is constrained from departure from rectilinear motion, and the bulging which might produce binding is precluded.

In accordance with another important feature of the invention, a convexly curved surface is arranged in sliding contact with one of the outer tape layers of a multilayer bundle to impart to it the curvature. Other features include a second, additional concave surface at the other side of the bundle to form what might be termed a curved channel for forcing the curved cross section on the tape bundle. The term channel indicates that the curved cross section is maintained over a significant length of tape path so that the convex and concave constraining surfaces have comparatively great lengths, while the height of the channel may only slightly exceed the width of the tape. The channel resulting from this configuration includes two facing walls, one convexly curved and the other curved to form the concave counterpart. The two surfaces cooperates to constrain the tape or bundle into the curved cross-sectional configuration.

Although it was found that even a single tape length, passing through the above described tape guide, moves with improved regularity and smoothness when subjected to shock or vibration conditions, the present invention is primarily concerned with, but not limited to, overcoming the limitations resulting from the binding effect. In view of the fact that the binding effect does not occur when a single tape layer is involved, the following detailed description specifically deals with a closed-loop tape recorder including a multilayer tape bundle.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing.

Identical elements are designated by the same reference numerals throughout the several views of the drawing.

Figures 1, 2, 3:
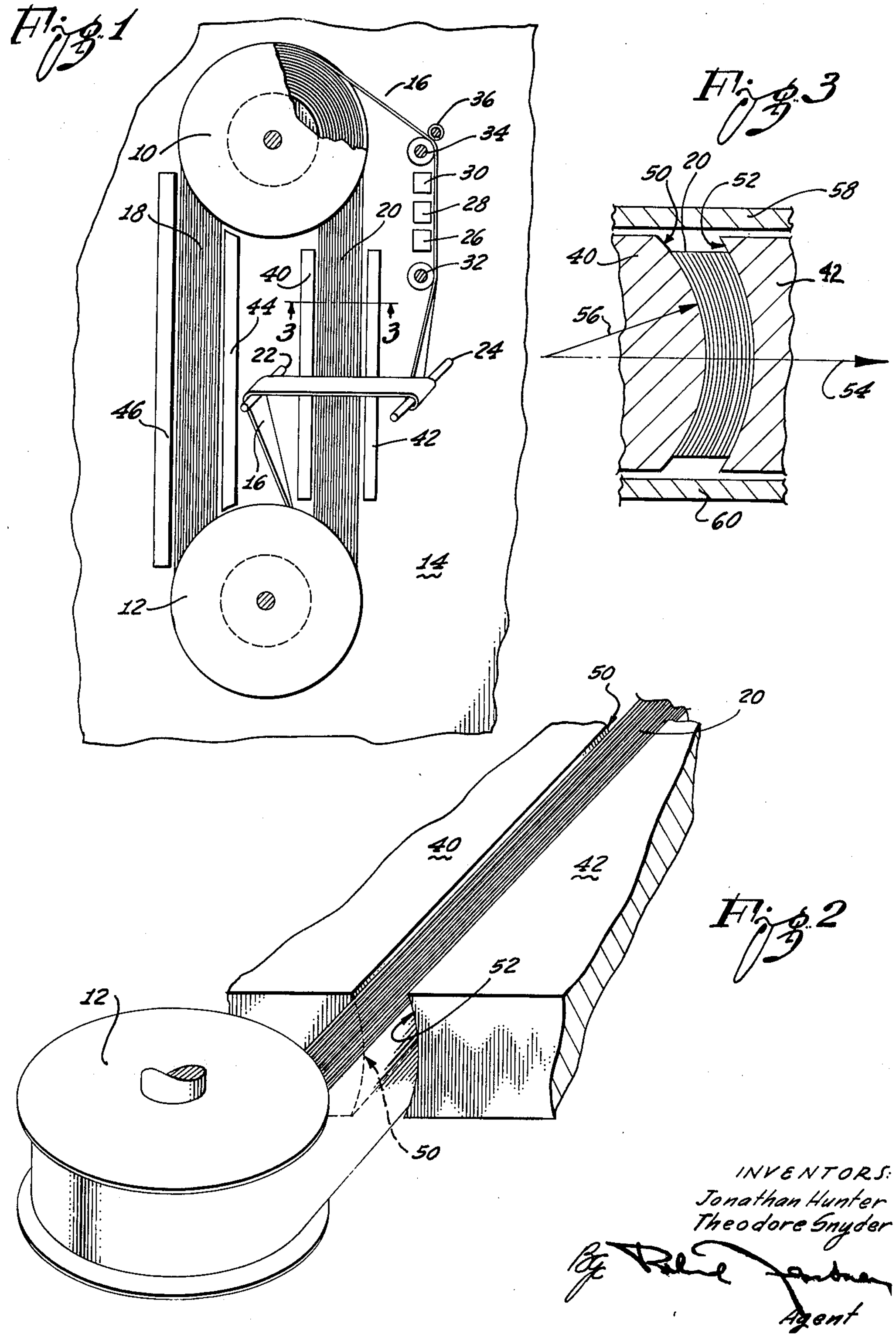
FIG. 1 is a top view of a tape recorder schematically indicating the arrangement of elements forming part of the device of the present invention.
FIG. 2 is an isometric view of a portion of a tape recorder illustrating one embodiment of the present invention.
FIG. 3 is a cross sectional view taken along the line 3—3 of FIG. 1.

Referring now to the specific embodiment illustrated in the drawing, an endless or closed-loop tape recorder is schematically shown in top view in FIG. 1. A pair of reels 10 and 12 is mounted on a panel 14, and a conventional magnetizable closed-loop tape, generally designated 16, is wound and guided as schematically shown. More specifically, the tape is wound in a number of layers around both reels 10 and 14 to form two multilayer bundles 18 and 20 of closely-adjacent layers. Frequently, forty to fifty or more layers are used. The innermost layer is guided to separate from the bundle 20, over a guide rod 22, on top of and across the tape layer bundle 20, to a second guide rod 24 and across three transducer heads 26, 28 and 30, arranged between idle rollers 32 and 34, and returned to reel 10 to form the outermost layer of firstly the bundle 18 and then of bundle 20. A driving capstan 36 for the tape, frictionally cooperating with idle roller 34, and rotated by a conventional mechanism including a motor and gears hidden below the panel 14 may be used. Of the three transducer heads shown, 26 may represent an eraser head while 28 and 30 designate a recording head and a reproducing head, respectively.

At this point it should be noted that the assembly as described in the preceding paragraph and shown in the schematic view of FIG. 1, is an illustrative example of a tape recorder assembly in which the endless or closed-loop tape forms two bundles of a great number of tape layers for the purpose of storing a significant length of tape concentrated in a comparatively small space. All of the other elements mentioned may be arranged in any other manner, and a different number of heads, reels or other components may be used. The present invention is particularly applicable to tape handling apparatus where, in the case of disturbances termed "binding," one of several adjacent layers of tape may travel with a speed slightly different from that of the adajcent layers. As little as the difference in speed might be, it can be shown that considerable shift of relative positions of tape locations may occur as the result of adverse conditions such as those mentioned above. When any of the intermediate layers in bundle 18 or 20 deviates from its normally straight path, binding occurs as described, due to the locally increased friction between tape layers, because pressure is built up between the layers in a direction which extends horizontally across the bundles in FIG. 1.

In accordance with the invention, and as described in the foregoing discussion, binding is effectively prevented by means of constraining tape guides which impart a curved cross section to each tape bundle. For this purpose, each tape bundle passes alongside a convexly curved, suitably cylindrical surface which is curved in a direction perpendicular with respect to tape motion direction. In other words, the axis of the cylinder of which the constraining surface forms part extends parallel with the tape motion direction.

In practice, each tape guide of the invention includes a pair of elongated bars, blocks or the like arranged alongside each of the tape bundles. These blocks form channels between one another, with blocks 40 and 42 forming a channel for tape bundle 20, and bars or blocks 44 and 46 similarly encompassing bundle 18. Generally, the channel forming elements extend into the region where the tape path reaches one or the other reel, with the inner block tapering off at the ends, as illustrated with respect to block 44, FIG. 1.

Continuing the description of the specific configuration of the tape guide surfaces, reference is made to FIGS. 2 and 3 which illustrate in detail the shape of the guiding surfaces involved, and especially referring to the tape layer bundle 20, shown in FIG. 2 in its relationship with reel 12, and illustrated in cross section in FIG. 3. The facing elongated surfaces of bars or blocks 40 and 42 are shaped to impart to the bundle the curvature which prevents binding. The surface 50 of bar 40 facing the bundle is a convex surface, curved in a plane perpendicular with respect to the centerline of the tape, or the motion direction of the tape which is coincident with the tape centerline.

It has been established by tests that, with the presence of a surface 50 alone, a considerable improvement in performance is achieved inasmuch as the tendency to bind is decreased. In specific instances, it was found sufficient to arrange the surface 50 along one side of the tape bundle in very close proximity, but spaced from it. This is due to the fact that it is not necessary to introduce curvature into the tape bundle, as long as it moves as smoothly as it should. At the slightest deviation from the straight path, the outermost layer contacts the curved guide surface and the bundle assumes the curved cross sectional configuration until the disturbance is eliminated. Although such system might be less reliable than that shown in the drawing, it offers the advantage of less frictional forces applied to the tape. However, and especially under high acceleration conditions, it was found that binding is practically eliminated with accelerations up to eighty times the acceleration resulting from the force of gravity, or 80 g., when the second constraining member 42 is added. Guide block or bar 42 is provided with a concave surface 52 facing the other side of tape layer bundle 20, and surface 52 is substantially parallel or complementary to surface 50. The two curved surfaces form a channel between one another and cause the bundle 20 to necessarily assume a curved cross sectional configuration as clearly shown in FIG. 3. As a result, each individual tape layer forming part of bundle 20 travels through the entire length of the channel with the curved cross sectional configuration. Consequently, none of the layers can assume another curvature in another direction. Local pressure cannot build up between any pair of adjacent layers, and binding is effectively prevented. The same is true with respect of bundle 18 constraint between identical guiding surfaces of elements 44 and 46.

By way of example, it should be noted that tests were run with a tape recorder using a conventional tape of 0.25 inch width, each of the bundles 18 and 20 including 46 individual layers of tape to accommodate a total length of 75 feet of a closed-loop tape having a thickness of about 0.0018 inch. The curvature of guide surfaces 50 and 52 was selected such that the radius 56, FIG. 3, had a length of one inch.

At this point it should be noted that, in principle, a very small curvature introduces significant stiffness into a tape bundle. Accordingly, curved guide surfaces, according to the invention, having an extremely slight curvature close to a flat plane, may be used. The device was accelerated up to 80 g. in each of three orthogonal directions including that indicated by arrow 54 in FIG. 3. No trace of a binding effect was found to occur for a testing period of four minutes. Furthermore, it was found by tests that lubrication of the tape may be omitted in numerous instances. However, good results are also obtained with greater curvature such as that corresponding to a radius of 0.5 inch or ⅝ inch.

It should also be noted that, for practical purposes, a pair of additional plate-shaped elements 58 and 60 is suitably added at both sides of each of the constraining elements 40, 42 and 44, 46, respectively, to close the channels in two additional directions to form tubular channels. Coverplates 58 and 60 do not contribute to the curvautre imparted to the tape bundles and have been omitted in FIGS. 1 and 2 for the purpose of clarity.

It is to be understood that the above-described arrangements are illustrative of the application of the principles of the invention. Numerous other arrangements may be devised by those skilled in the art without departing from the spirit and scope of the invention. Thus, by way of example and not of limitation, the elements forming the curved guiding surfaces may be suitably shaped rollers. More particularly, surface 50 may be replaced by a linearly-arranged series of spheres, and in this case the fact that a more intricate structure is involved is compensated for by a reduction of friction, especially if the spheres are rotatably mounted. In a similar manner, a series of hollow ground rollers may be substituted for the concave surface 52. In addition, several spheres and/or rollers may be used in one or more cross sectional planes to provide the concave-convex guides of the invention.

Accordingly, from the foregoing remarks, it is to be understood that the present invention is to be limited only by the spirit and scope of the appended claims.

What is claimed is:

1. In a high acceleration resistant tape recorder, a closed-loop magnetic recording tape, at least one transducer head in operative relationship with said tape, means for driving said tape, a pair of parallel elongated surfaces forming a channel between one another and being curved in a plane perpendicular with respect to the direction of the channel, one surface being concave, the other surface being convex, and means for passing a bundle formed by a number of layers of said closed-loop recording tape through said channel, whereby the tape bundle assumes a curved cross-sectional configuration.

2. In a shock-proof closed-loop tape recorder, an endless tape winding arrangement wherein the movement of one convolution is dependent on and induced by the linear movement of the convolutions radially inward therefrom, the tape forming a multilayer tape bundle, and a channel for constraining said multilayer tape bundle along a straight path, said channel including first and second surfaces curved about an axis parallel with said path and facing one another, the first surface being convex and the second surface being concave, for imparting a curved cross sectional configuration to the portion of the bundle as it moves through said channel.

3. In a tape recorder, an endless tape winding arrangement wherein the movement of one convolution is dependent on and induced by the linear movement of the bundle, the tape forming a multilayer bundle, means for driving said tape bundle to move along a straight path of predetermined direction, and means including a convexly curved surface facing and engaging the surface of the tape bundle for imparting to the tape bundle a curvature perpendicular with respect to said direction, and including means cooperating with said surface for urging said bundle toward said surface.

4. In an endless tape winding arrangement wherein the movement of one tape convolution is dependent on and induced by the linear movement of the tape convolutions radially inward therefrom, the tape forming a multilayer bundle, means for driving said bundle to move along a straight path, the speed of each layer being different from that of adjacent layers, and constraining means including at least one surface curved about an axis parallel with said path and extending alongside said path for imparting curvature to the tape bundle by slight pressure applied to one of the outermost layers in a direction perpendicular to the plane of the tape layer facing said surface and including means cooperating with said surface to provide said slight pressure.

5. In an endless tape winding arrangement wherein the movement of one tape convolution is dependent on and induced by the linear movement of a tape bundle, the tape forming a multilayer bundle, means for driving said bundle to move along a straight path, and contraining means including a guide portion having an arcuate configuration disposed transversely to said linear movement for imparting to said bundle a curved cross sectional configuration as each layer moves along said path at a speed different from that of the other layers of the bundle, and including means cooperating with said guide portion for urging said bundle toward said guide.

6. In an endless tape winding arrangement wherein the movement of one tape convolution is dependent on and induced by the linear movement of the tape convolutions radially inward therefrom, the tape forming a multilayer bundle, means for driving said bundle to move along a straight path, and constraining means for said tape bundle including a channel through which the tape bundle moves and which is formed by first convex and second concave, substantially parallel, surfaces curved in a plane perpendicular with respect to the direction of tape motion to prevent binding, as each layer moves along said path at a speed which is different from that of the other layers of the bundle.

7. In a closed-loop tape recorder, a magnetic tape, an endless tape winding arrangement wherein the movement of one convolution is dependent on and induced by the linear movement of the convolutions radially inward therefrom, the tape being arranged in a number of adjacent tape layers forming a bundle, means for moving said tape along a straight path, and a channel defining said path and formed by a pair of parallel guiding surfaces curved about an axis in the direction of tape motion, each of said surfaces extending substantially along one side of and adjacent said tape bundle, one of said surfaces being convex and the other surface being concave, to impart a curved cross sectional configuration to the portion of the bundle as it moves through said channel.

8. In a shock-proof tape-handling device, an endless tape winding arrangement wherein the movement of one tape convolution is dependent on and induced by the linear movement of the convolutions radially inward therefrom, the tape being arranged in a number of adjacent tape layers forming a bundle, means for moving said bundle along a straight path, with each layer of the bundle moving at a speed which is different from that of adjacent layers, and a channel defining said path and formed by a pair of guides curved about an axis in the direction of tape motion, each of said guides defining a surface extending substantially along one side of and adjacent said tape bundle, one of said surfaces being convex and the other surface being concave, to impart a curved cross sectional configuration to the portion of the bundle as it moves at its individual speed through said channel.

9. An endless tape winding arrangement wherein the tape forms a multilayer bundle and wherein the movement of one tape convolution is dependent on and induced by the linear movement of said multilayer bundle, means for driving a number of adjacent layers of said tape bundle to move along a straight path, each layer of said bundle moving at an individually different speed, and constraining means including cooperating convex and concave guides interengaging with said bundle for imparting to each tape layer a curved cross sectional configuration as each layer moves along said path, at said individual speed which is different from that of adjacent layers.

References Cited by the Examiner

UNITED STATES PATENTS

| | | | |
|---|---|---|---|
| 1,986,734 | 1/1935 | Lorig | 226—88 |
| 2,490,771 | 12/1949 | Begun | 242—55.19 |
| 2,499,119 | 2/1950 | Smith et al. | 242—55.19 |
| 2,651,966 | 9/1953 | Bradford | 242—76 |
| 3,002,670 | 10/1961 | Namenyi-Katz | 226—88 |

FOREIGN PATENTS

| | | |
|---|---|---|
| 635,101 | 1/1962 | Canada. |

MERVIN STEIN, *Primary Examiner.*

JOSEPH P. STRIZAK, *Examiner.*